Patented Mar. 13, 1923.

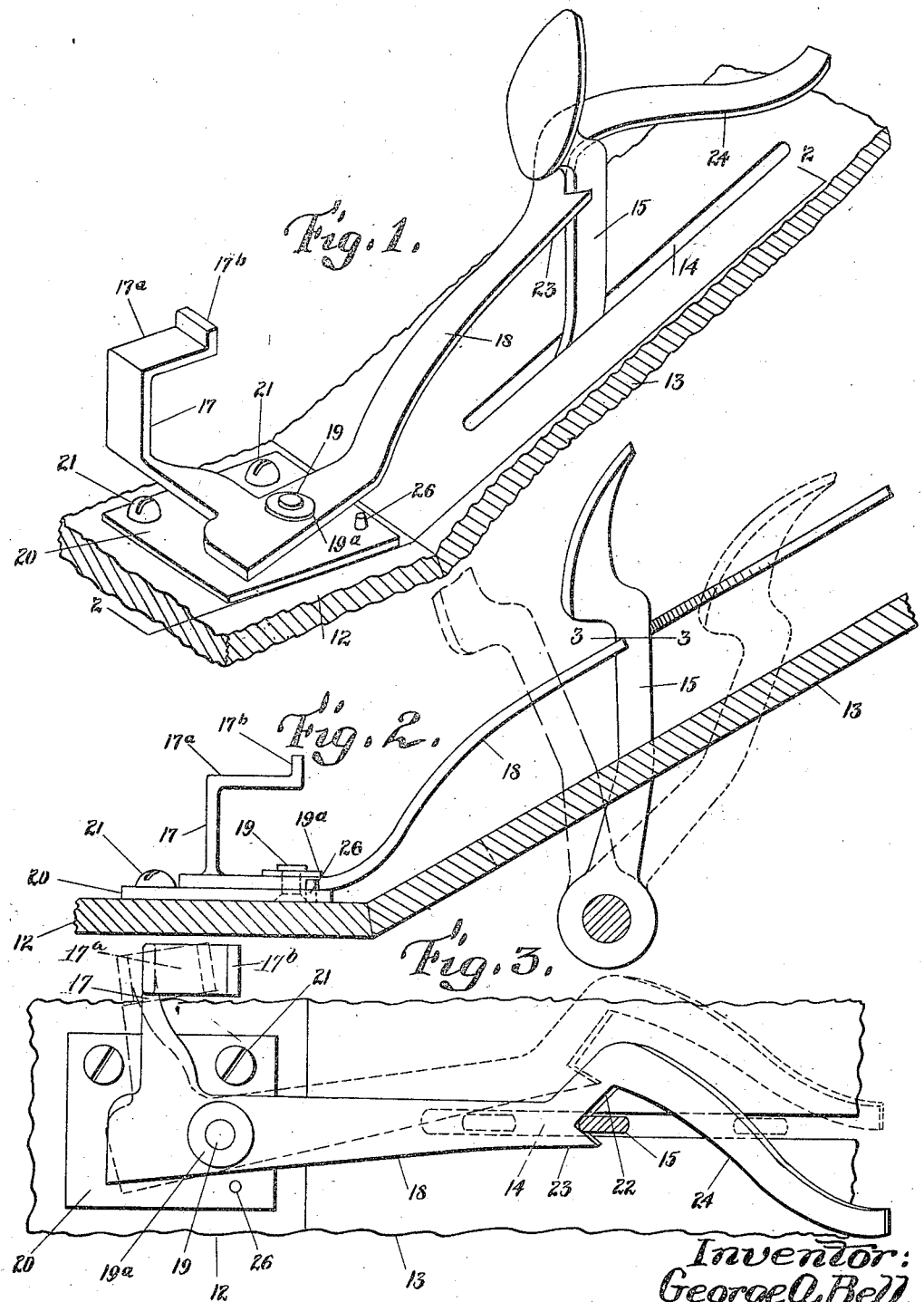

1,448,105

UNITED STATES PATENT OFFICE.

GEORGE A. BELL, OF BELMONT, NEW HAMPSHIRE.

CLUTCH-LEVER STOP FOR MOTOR VEHICLES.

Application filed July 22, 1922. Serial No. 576,714.

*To all whom it may concern:*

Be it known that I, GEORGE A. BELL, a citizen of the United States, residing at Belmont, in the county of Belknap and State of New Hampshire, have invented new and useful Improvements in Clutch-Lever Stops for Motor Vehicles, of which the following is a specification.

The invention is embodied in a simple, effective and easily applied stop for the clutch lever of a Ford or other motor vehicle, adapted to be pivotally connected with a floor section of the vehicle body, at a point adjacent to the slotted floor section in which the clutch lever swings from its high speed to its low speed position, and adapted also to be inoperatively confined by the clutch lever when the latter is in either of said positions, and to be shifted by a slight movement of the operator's heel when the clutch lever approaches neutral position, so that the stop may be rendered operative to arrest the clutch lever in neutral position, the stop lever being shiftable to its inoperative position by a movement of the clutch lever from neutral to low speed position, and being inoperatively confined when the clutch lever is in either position excepting neutral.

Of the accompanying drawings forming a part of this specification,—

Figure 1 is a perspective view, showing portions of two floor sections, and a portion of the clutch lever of a Ford car, and a stop embodying my invention, adjusted to confine the clutch lever in neutral position.

Figure 2 is a side or edge view, showing the entire clutch lever, the floor sections being shown in section on line 2—2 of Figure 1.

Figure 3 is a top plan view, the clutch lever being shown in section on line 3—3 of Figure 2.

The same reference characters indicate the same parts in all of the figures.

In the drawings, 12 represents the usual horizontal floor section of a Ford car, and 13 the inclined section having a slot 14 in which the usual clutch lever 15 is movable from the high speed position shown by the left-hand dotted line representation of said lever (Figure 2), to the low speed position shown by the right-hand dotted line representation. The full line representation shows the neutral position of the clutch lever.

My improved stop is intended to arrest the clutch lever in neutral position by preventing it from being moved by the usual spring pressure exerted upon it, to the high speed position in which it is normally held. Said stop is embodied in a stop lever, preferably of bell-crank form, including a relatively short arm 17, and a longer arm 18. The stop lever is connected with the floor section 12, by means including a pivot stud 19, which permits a horizontal swinging movement of the stop lever, and is preferably secured to a base plate 20, bearing on the section 12, and attached thereto by screws 21, the stud being provided with a head 19ª, which confines the stop lever on the base plate. Said head may be a washer confined by the upset end of the stud.

The longer arm 18 is formed to overhang the inclined floor section 13, and has a diversified inner edge including a recessed intermediate edge portion 22, formed to confine the clutch lever in neutral position, an inner edge portion 23, and an outer edge portion 24.

The location of the pivot 19 with relation to the path of the clutch lever, and the arrangement of the edge portions 22, 23 and 24, are such that when the clutch lever is in either high or low speed position, it confines the stop lever in the inoperative position shown by dotted lines in Figure 3, or in other words, prevents the stop lever from moving to the operative position shown in Figures 1 and 2, and by full lines in Figure 3.

When the clutch lever approaches its neutral position, the stop lever is movable by pressure of the operator's heel on the shorter arm 17, to an operative position, with the recessed edge portion 22 in the path of the clutch lever, so that the longer arm 18 acts as a strut, preventing the return of the clutch lever to normal high speed position.

As best shown by Figure 3, the edge portions 23 and 24 are oblique to the path of the clutch lever, the edge portion 24 extending more abruptly across the path of said lever than the portion 23, and being arranged so that a movement of the clutch lever from neutral toward low speed position, causes the clutch lever to push the stop lever aside to its inoperative position, so that it does not obstruct the return of the clutch lever to high speed position. The obliquity of the edge portion 23 is such that it cooperates with the clutch lever when the latter is in high speed position in preventing movement of the recessed edge portion 22 of the stop lever into the path of the clutch lever.

It will be seen, therefore, that the stop lever can be operated to confine the clutch lever in neutral position, only when the clutch lever approaches said position.

The shorter arm 17 projects upward from the base plate 20, and projects from the outer edge of the longer arm, so that it may be conveniently moved by pressure of the heel of the operator's shoe, while the sole of the shoe bears on the clutch lever, a slight swinging movement of the foot being sufficient.

For convenience of a short-foot operator, I provide the arm 17 with an angular extension 17ª, having a lip 17ᵇ, which may be engaged by the operator's heel at a point well above the floor. The base plate is preferably provided with stops at opposite sides of the longer arm of the stop lever, to limit the swinging movements of said lever, and prevent the lever from swinging entirely around on the base plate, so that in applying the stop to the floor section 12, there will be no uncertainty as to the direction in which the longer arm should project. One of these stops may be the head of one of the attaching screws 21, and the other may be a stud 26 formed on or attached to the base plate.

I claim:

1. A clutch lever stop for motor vehicles, comprising a stop lever connected by a pivot with a floor section, and including a relatively short heel-engaging arm adjacent to the pivot, and a longer arm formed to overhang the slotted floor-board section in which a clutch lever is movable to high and low speed positions, and to an intermediate neutral position, one longitudinal edge of said longer arm being diversified, and provided with a recessed intermediate portion, formed and arranged to confine the clutch lever in neutral position, and with inner and outer portions formed to be arrested by the clutch lever when the latter is in either high or low speed position, the arrangement being such that the stop lever is confined by the clutch lever in an inoperative position, until the clutch lever approaches neutral position, and is then movable by the operator's heel to engage the said recessed portion with the clutch lever.

2. A clutch lever stop substantially as specified by claim 1, the outer and inner portions of said longitudinal edge being oblique to the path of the clutch lever, so that movement of the clutch lever from neutral to either high or low speed position, forces the stop lever to an inoperative position.

3. A clutch lever stop substantially as specified by claim 1, comprising also a base plate, adapted for attachment to a floor section, and provided with a headed pivot stud on which the clutch lever is adapted to swing, said stud confining the stop lever on the base plate, said plate being provided with stops limiting the swinging movement of the stop lever.

4. A clutch lever stop substantially as specified by claim 1, the said shorter arm projecting upward from the longer arm, and including an angular extension having a heel-engaging lip.

In testimony whereof I have affixed my signature.

GEORGE A. BELL.